May 20, 1952 J. C. CURTIS 2,597,301
ROCK DRILL BIT

Filed Aug. 21, 1945 3 Sheets-Sheet 1

*Inventor:*
*John C. Curtis.*
*by Charles F. Osgood,*
*Atty.*

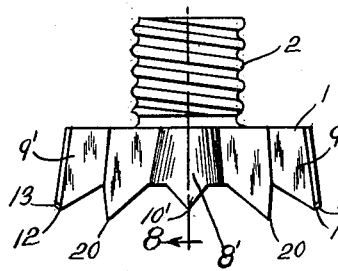

May 20, 1952 J. C. CURTIS 2,597,301
ROCK DRILL BIT

Filed Aug. 21, 1945 3 Sheets-Sheet 3

Inventor:
John C. Curtis.
by Charles F. Osgood,
Atty.

Patented May 20, 1952

2,597,301

UNITED STATES PATENT OFFICE 2,597,301

ROCK DRILL BIT

John C. Curtis, Claremont, N. H., assignor to Joy Manufacturing Company, a corporation of Pennsylvania Application August 21, 1945, Serial No. 611,829

8 Claims. (Cl. 255—64)

This invention relates to drill bits and more particularly, but not exclusively, to an improved detachable rock drill bit of the non-resharpenable "throw away" type having an improved formation of cutting surfaces on the bit face.

Detachable rock drill bits, particularly those of the non-resharpenable "throw away" type, must be small in size containing a relatively small amount of metal, relatively inexpensive in cost and capable of effecting their cutting function in an extremely efficient manner, so that the bit may be readily discarded when worn. In order to provide cutting surfaces which are extremely effective for a bit of relatively small size, it is desirable to provide cutting edges disposed near the center of the bit face and cutting edges at or near the outer bit periphery, and also to provide intermediate cutting edges so that the material being drilled may be effectively cut away. It is also desirable to provide peripheral edges which have both cutting and reaming functions and intermediate cutting edges which have a chopping function. Also, it is desirable to project the intermediate chopping edges forwardly from the bit face a substantial distance in advance of the other edges. By so arranging the cutting edges, it is possible to reduce the work performed by each individual edge so that cumulatively the edges perform the drilling function in an extremely effective manner.

The invention, from its broad aspect, may comprise a drill bit having cutting edges arranged relatively close to the center of the bit face and cutting edges at or near the bit periphery, together with intermediate cutting edges arranged on the bit face between the peripheral cutting edges and the cutting edges which are located close to the bit center; and in a preferred embodiment, the intermediate edges are projected forwardly from the bit face a substantial distance in advance of the outer peripheral edges. From another aspect of the invention, the drill bit may comprise peripheral reaming edges lying in a surface of revolution which lies inside the bit periphery and additional cutting edges spaced inwardly on the bit face from the reaming edges and projected from the bit face forwardly a substantial distance in advance of the reaming edges. In one embodiment of the invention, the intermediate edges are projected a substantial distance in advance of both the peripheral reaming edges and the inwardly located cutting edges, and the intermediate edges have a chopping function while the peripheral edges have both cutting and reaming functions. In a more specific embodiment, the drill bit has, at its forward end, rectangularly related pairs of alined wings whose extremities lie in a common surface of revolution which contains the bit periphery, the wings of one of the pairs supporting alined cutting edges extending along a diametric line and whose outer extremities extend to the common surface of revolution, and the wings of the other pair, adjacent their outer ends, supporting curved reaming edges which lie substantially in a surface of revolution lying inside the outer surface of revolution, and the front end of the bit having intermediate chopping edges arranged between said reaming edges and the axial center of the bit. In a preferred embodiment, the chopping edges are parallel with the alined cutting edges; while in another embodiment, the chopping edges extend at right angles to the alined cutting edges; and in still another embodiment, the inner and intermediate cutting edges lie in a spiral between the center of the bit face and the peripheral cutting edges and all of the chopping edges in the various forms may project a substantial distance in advance of the peripheral cutting edges. In the several embodiments, the cutting edges are arranged in such manner that the work performed by each individual cutting edge is comparatively small but cumulatively the cutting edges perform the cutting function in an extremely effective manner.

An object of the present invention is to provide an improved drill bit. Another object is to provide an improved rock drill bit having an improved arrangement of the cutting surfaces on the bit face whereby the drilling function is accomplished in an extremely effective manner. A further object is to provide an improved detachable rock drill bit of the non-resharpenable "throw away" type having a novel formation of the cutting surfaces on the bit face whereby, in comparison with the relatively small size of the bit, an extremely efficient cutting action is attained. Still another object of this invention is to provide an improved drill bit having peripheral reaming edges, cutting edges located inwardly from the reaming edges near the center of the bit face, and intermediate chopping edges arranged between the reaming edges and the cutting edges and projecting forwardly a substantial distance in advance of the reaming edges. A still further object is to provide an improved drill bit having a novel cutting surface formation embodying arcuate reaming edges located near the bit periphery and chopping edges spaced inwardly from the reaming edges and projecting a substantial distance in advance of the reaming edges. Still another object is to provide a drill bit having a novel formation of the cutting face wherein a plurality of cutting edges arranged in a novel manner are provided so that the work performed by each individual cutting edge is comparatively small, while the cutting edges cumulatively perform the cutting function in an extremely effective manner.

These and other objects and advantages of the invention will, however, hereinafter more fully appear.

In the accompanying drawings there are shown for purposes of illustration several forms which the invention may assume in practice.

In these drawings:

Fig. 6 is a side elevational view of a modified form of drill bit.

Fig. 7 is a side elevational view of the bit shown in Fig. 6, with the bit turned through 90°.

Fig. 8 is a view in longitudinal section taken on line 8—8 of Fig. 6, with the bit attached to a rod.

Fig. 9 is a front end view of the drill bit shown in Fig. 7.

Fig. 10 is a front end view of another modified form of drill bit.

Fig. 11 is a side elevational view of the drill bit shown in Fig. 10.

Fig. 12 is a side elevational view of the drill bit shown in Fig. 11, with the bit turned through 90°.

Fig. 13 is a side elevational view of still another modified form of drill bit.

Fig. 14 is a side elevational view of the bit shown in Fig. 13, with the bit turned through 90°.

Fig. 15 is a front end elevational view of the drill bit shown in Fig. 14.

Figure 1:
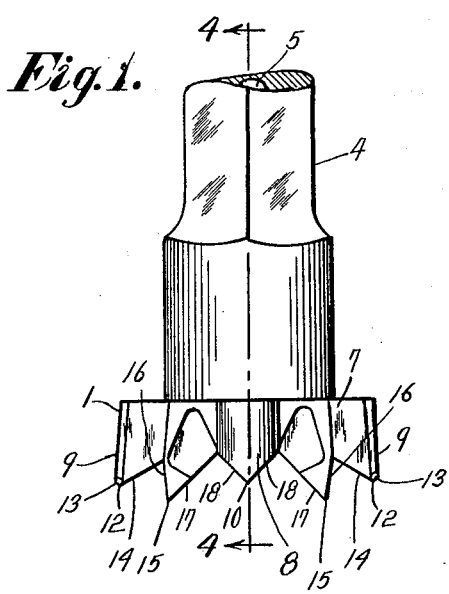
Fig. 1 is a side elevational view of a preferred form of the improved drill bit, showing the latter attached to a drill rod.
Figure 2:
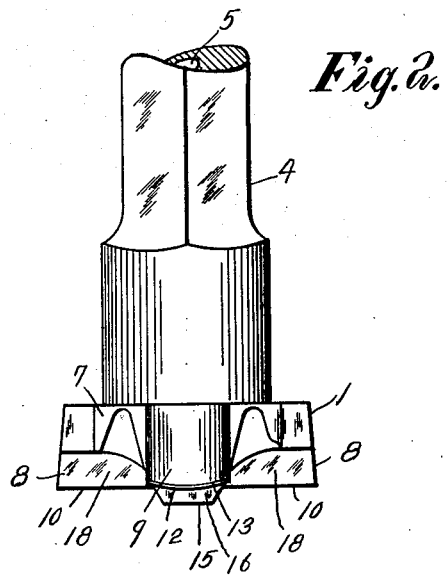
Fig. 2 is an elevational view of the drill bit and rod shown in Fig. 1, with the bit and rod turned through 90°.
Figure 3:
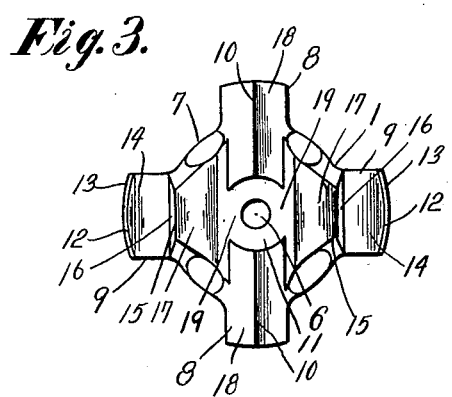
Fig. 3 is an end view of the drill bit shown in Fig. 1, looking toward the front cutting face.
Figure 4:
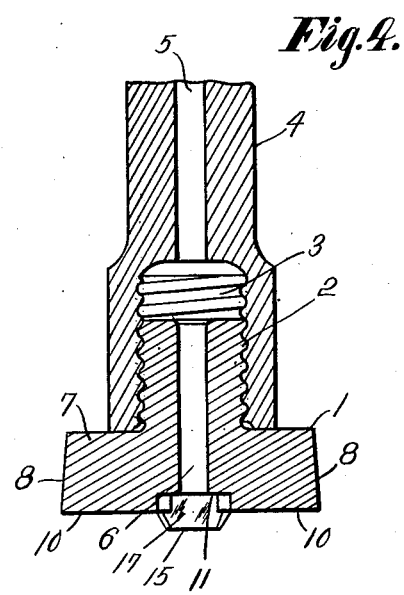
Fig. 4 is a view in longitudinal section taken on line 4—4 of Fig. 1.
Figure 5:
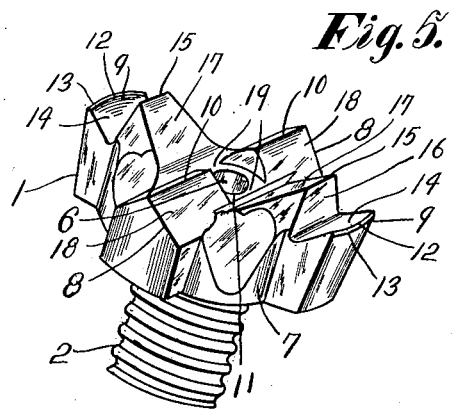
Fig. 5 is an enlarged perspective view of the drill bit shown in Figs. 1 to 4 inclusive.
Figure 16:
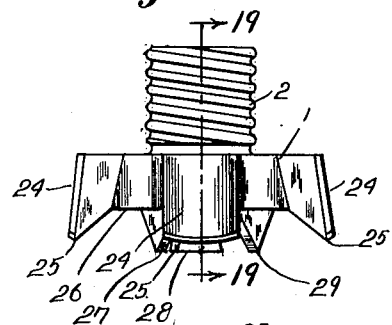
Fig. 16 is a side elevational view of a further modified form of drill bit.
Figure 17:
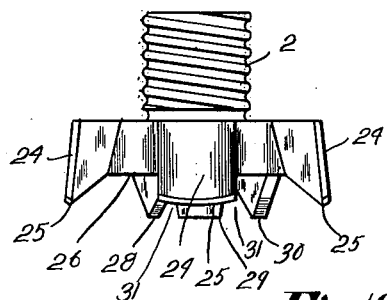
Fig. 17 is a side elevational view of the drill bit shown in Fig. 16, with the bit turned through 90°.
Figure 18:
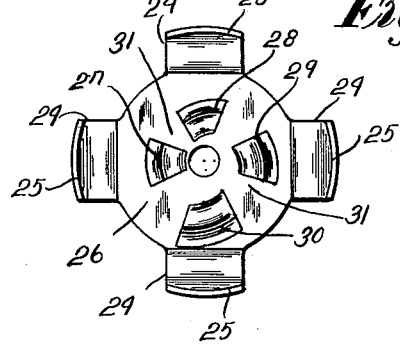
Fig. 18 is a front elevational view of the drill bit shown in Fig. 16.
Figure 19:
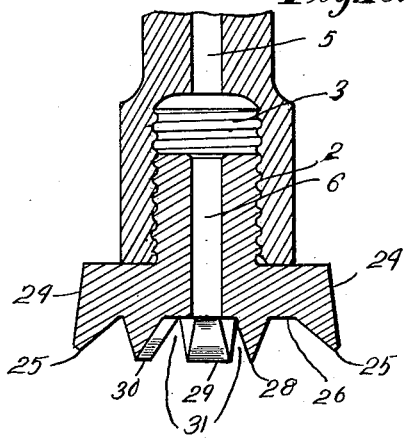
Fig. 19 is a view in longitudinal section taken on line 19—19 of Fig. 16, showing the drill bit attached to a drill rod.

In the preferred illustrative embodiment of the invention, shown in Figs. 1 to 5 inclusive, there is a detachable rock drill bit 1 of comparatively small size having a reduced threaded projection 2 received in a threaded socket 3 of a drill rod 4. The drill rod and bit are adapted for association with a hammer rock drill and, as usual in such rock drills, cleansing fluid is adapted to be conducted to the cutting face of the drill bit to clear away the cuttings as drilling progresses, and the drill rod and bit have axial passages 5 and 6 respectively, for conducting the cleansing fluid to the cutting face. The improved drill bit is of the type which is percussively actuated and intermittently rotated during drilling, and includes a body 7 having at its forward side integral pairs of wings 8 and 9 arranged in right-angular relation to each other, with the wings of the pair 9 materially wider than the wings 8. The pairs of wings at their outer extremities lie in what may be thought of, without substantial inaccuracy, as a common surface of revolution which contains the bit periphery and whose axis coincides with the bit axis. The narrow wings 8, in this improved construction, support alined cutting edges 10, 10 extending along a diametric line, and the bit face is recessed at 11 between these alined edges. The axial bit passage communicates with the recess 11 so that cleansing fluid may be conducted in an adequate manner to the cutting surfaces of the bit. The wider wings 9 each support a curved reaming and cutting edge 12 lying slightly inside the bit periphery substantially in a surface of revolution which is coaxial with and lies inside the surface of revolution containing the bit periphery. In this instance, the reaming and cutting edges 12 are curved both in end elevation, as shown in Fig. 3, and in side elevation, as shown in Fig. 2. Extending rearwardly and outwardly from the curved edges 12 between the concentric surfaces of revolution, is a sloping supporting surface 13 lying in a surface of a cone whose axis coincides with the bit axis with the cone-apex in advance of the bit and the surfaces 13 terminate at the bit periphery a slight distance rearwardly of the forward face of the bit. The sloping surfaces 13 have an important advantage which resides in the fact that they break the material being drilled outwardly with a wedging action, so that loss in hole-gauge is retarded, reducing the necessity of frequently changing bits to increase the bit-diameter as the hole deepens. By locating the reaming edges 12 slightly inside of the bit periphery, the danger of fracture of the reaming edges or adjacent portions of the bit-wings is substantially avoided, yet the reaming edges lie close enough to the bit periphery to effect efficiently their reaming and cutting functions. The bit at the forward side of the wider wings 9 is formed with forwardly and outwardly inclined plane surfaces 14, and the arcuate reaming edges 12 lie at the intersection of the surfaces 13 and 14 as clearly shown. In this novel bit structure, arranged on the bit face intermediate the alined cutting edges and the arcuate reaming edges, are straight chopping edges 15 herein desirably of less length than each of the alined edges 10 and extending in parallelism with the latter. The chopping edges desirably project forwardly from the bit face in advance of the edges 10 and 12 and an outer plane surface 16 extends rearwardly and slightly outwardly from each of the chopping edges 15, and the plane surfaces 14 and 16 lie in a dihedral angle and intersect along a straight line parallel with but located rearwardly from the cutting edges 10 and the chopping edges 15. Extending rearwardly and inwardly from the chopping edges 15 are plane surfaces 17, and the plane side surfaces 18, 18 of the wedge-shaped supporting portion for the alined cutting edges 10 intersect with the surfaces 17 along parallel lines which are parallel with but located rearwardly of the lines of intersection of the surfaces 14 and 16. The outer surfaces 16 of the chopping edges are inclined slightly outwardly with respect to the axis of the drill bit, while the inner surfaces 17, 17 are disposed at a substantial angle with respect to the bit axis so that the chopping edges are supported by portions of chisel-like formation. The several plane surfaces 14, 16, 17 and 18 extend across the bit face in parallelism to a common straight line at right angles to the bit axis and the outer surfaces 14 and 16, between the reaming and chopping edges, make a somewhat more acute dihedral angle than the inner surfaces 17 and 18 between the chopping edges and the alined cutting edges. The sides of the recess 11 are cut away at 19 so that the cleansing fluid may flow laterally from the recess toward the chopping edges, and the cuttings may flow transversely of the bit face between the cutting and chopping edges and rearwardly longitudinally of the bit between the wings so that ample flow of fluid with respect to the bit face is obtained.

While it is intended that the drill bit be thrown away when it becomes worn without resharpening, it will be evident that due to the novel arrangement of the cutting surfaces of the bit lying in planes extending across the bit face in parallelism to a common straight line perpendicular to the bit axis, it is possible to resharpen, as by grinding, the bit face of the cutting edges as conditions permit. This may be readily possible in a detachable rock drill bit of the conventional relatively large size which contains sufficient metal to permit resharpening. In this instance, however, the drill bit is of such small size and contains such a comparatively small amount of metal and is so cheap that it may be discarded when worn and replaced by a new bit at at least no greater cost than a conventional relatively large bit which is designed to be resharpened.

In the modification shown in Figs. 6 to 9 inclusive, the improved drill bit is generally like that of the embodiment above described, with the exception that the formation of the cutting face of the bit is slightly different. In this embodiment, the integral pairs of wings 8' and 9' are of the same width and the alined cutting edges 10' are of less length than the cutting edges 10 so that a substantially larger recess 11' is provided at the central portion of the bit face. Chopping edges 20 are arranged in pairs intermediate the cutting edges 10' and the reaming edges 12, and there is a notch 21 between each pair of aligned chopping edges and these notches provide cleansing fluid passageways between the recess 11' and the reaming edges 12 so that an adequate flow of cleansing fluid to the cutting surfaces of the bit is obtained. Cleansing fluid may flow from the axial bit passage 6 to the recess 11' and transversely of the bit face between the alined cutting edges 10' and the chopping edges 20 and through the notches 21 to the reaming edges 12, and the fluid then flows rearwardly of the bit between the wings so that extremely effective clearing away of the cuttings is afforded.

In the modification shown in Figs. 10 to 12 inclusive, the drill bit is quite like that shown in Figs. 6 to 9 inclusive with the exception that the recess 22 between the alined cutting edges 10 is somewhat smaller, more nearly like that of Fig. 3, and the chopping edges 20' are somewhat shorter. In this embodiment, the supporting portions for the chopping edges, instead of being of chisel-like formation as shown in Figs. 1 and 6, are substantially wedge-shaped with the side surfaces 16' and 17' disposed at equal angles and of the same shape and extent. The notches 21' between the chopping edges are somewhat deeper and wider than the notches 21 of Fig. 9.

In the form of the invention shown in Figs. 13 to 15 inclusive, the alined cutting edges 10' and the curved reaming edges 12 are the same as those in Fig. 9. In this embodiment, the chopping edges 23 extend at right angles to a diametric line including the cutting edges 10', and are arranged substantially perpendicular to lines tangent with the arcuate reaming edges 12 at the bit periphery. The chopping edges 23 project in advance of the reaming and cutting edges, as in the other embodiments, and are parallel and spaced equidistantly from the axial center of the bit. Cleansing fluid may flow from the bit passage laterally between the chopping edges, then transversely to the reaming edges, and then rearwardly of the bit intermediate of the wings. As in the embodiments shown in Figs. 1 and 6, the supporting portions for the chopping edges are of chisel-like formation.

The modification shown in Figs. 16 to 19 inclusive likewise shows a winged bit generally similar to those of the preceding embodiments. The bit body has pairs of identical wings 24 arranged in right angular relation in cruciform formation and whose extremities lie in common surface of revolution containing the bit periphery. Each of the wings support reaming edges 25, like the edges 12, lying substantially in a surface of revolution which lies inside the peripheral surface of revolution. Projecting forwardly from a plane front surface 26 on the bit body and arranged inside the reaming edges, are cutting and chopping edges 27, 28, 29 and 30 which project forwardly in advance of the reaming edges. These cutting and chopping edges 27, 28, 29 and 30 are preferably arranged in a spiral extending from near the axial center of the bit outwardly to the exterior of the bit body from which the wings project, as clearly shown in Fig. 18. While there are but four cutting and chopping edges shown arranged in spiral formation, it will be evident that a smaller or a greater number of edges may be provided if desired. The cutting and chopping edges 27 and 28 are located relatively near the axial center of the bit and the chopping edges 29 and 30 are arranged between the edges 27 and 28 and the outer reaming edges 25. Spaces 31 separate the edges 27, 28, 29 and 30 so that an ample flow of cleansing fluid over the bit face to the reaming edges is afforded.

As a result of this invention, an improved rock drill bit of the detachable "throw away" type is provided, which is relatively small in size, containing comparatively little metal, and cheap, and which is extremely efficient. The improved drill bit, due to its relatively inexpensive design, may be readily discarded when worn without resharpening. It will be evident, by arranging the cutting and reaming edges in the manner disclosed, and by the provision of the intermediate chopping edges projecting a substantial distance in advance of the cutting and reaming edges, drilling is effected in an extremely efficient manner. The intermediate chopping edges, arranged in the novel manner shown, greatly decrease the drilling load on the cutting and reaming edges so that the material being drilled is effectively cut away. Also, the novel arrangement of the cutting surfaces on the bit face enables ample flow of cleaning fluid with respect to the cutting surfaces effectively to clear away the cuttings. The manners of use and the other advantages of the invention will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a rock drill bit of the kind which is percussively actuated and intermittently rotated during drilling, a bit body having curved cutting and reaming edges substantially at or near the periphery of the bit, parallel straight chopping edges spaced equi-distantly from the axial center of the bit at opposite sides of the bit face and projecting a substantial distance forwardly in advance of said curved edges, and an additional straight cutting edge located on the bit face rearwardly of said chopping edges.

2. A drill bit of the type which is percussively actuated and intermittently rotated during drilling, having at its forward end rectangularly-related pairs of alined wings whose extremities lie in a common surface of revolution whose axis coincides with the bit axis, the wings of one of said pairs supporting alined cutting edges whose outer extremities extend to said surface of revolution, and the wings of the other pair, adjacent their outer ends, supporting reaming edges which lie substantially in a surface of revolution lying inside said first mentioned surface of revolution, and said bit having chopping edges located between said reaming edges and the axial center of the bit, said chopping edges projecting forwardly a substantial distance in advance of said reaming edges and said alined cutting edges.

3. A drill bit of the type which is percussively actuated and intermittently rotated during drilling, having at its forward end rectangularly-related pairs of alined wings whose extremities lie in a common surface of revolution whose axis coincides with the bit axis, each of said wings supporting a cutting edge and the cutting edges of the wings of one of said pairs lying substantially in a surface of revolution which lies inside said first mentioned surface of revolution, and additional cutting edges on the bit arranged inwardly of said second surface of revolution toward the axial center of the bit and projecting forwardly a substantial distance in advance of said first mentioned cutting edges, said cutting edges which lie in said second surface of revolution and said additional cutting edges each lying half at one side and half at the other of a plane which extends diametrically of the bit and bisects the wings on which said cutting edges lie in said second surface of revolution are supported.

4. In a drill bit of the type which is percussively actuated and intermittently rotated during drilling, a bit body formed with integral pairs of wings arranged in right-angular relation to each other at the forward cutting end of the bit, one of said pairs of wings supporting a pair of alined cutting edges extending along a diametric line and the other pair of said wings each supporting a curved reaming edge slightly inside the bit periphery and having an outer curved supporting surface receding rearwardly outwardly and terminating at the bit periphery, said reaming edges being generally arcuate in both end and in side elevation, and the forward end of the bit between said alined cutting edges and each of said arcuate reaming edges supporting chopping edges which project forwardly from the bit face a substantial distance in advance of said reaming edges and said alined cutting edges.

5. A rock drill bit of the kind which is percussively actuated and intermittently rotated during drilling, having at its cutting end integral pairs of wings arranged in right-angular relation to each other, one of said pairs of wings supporting diametrically extending cutting edges in a common diametric plane and the other pair of wings each supporting adjacent the periphery of the bit a cutting and reaming edge generally arcuate both in end and in side elevation, and the forward end of the bit between the diametric plane of said diametrically extending edges and each of said cutting and reaming edges formed with an intermediate chopping edge projecting forwardly a substantial distance in advance of both said arcuate cutting and reaming edges and said diametrically extending edges.

6. In a rock drill bit of the kind which is percussively actuated and intermittently rotated during drilling, a bit body having curved cutting and reaming edges substantially at or near the periphery of the bit, parallel straight chopping edges spaced equidistantly from the axial center of the bit at the opposite sides of the bit face and projecting forwardly a substantial distance in advance of said curved edges, and an additional straight cutting edge located on the bit face rearwardly of said chopping edges and extending at right angles thereto.

7. In a rock drill bit of the kind which is percussively actuated and intermittently rotated during drilling, a bit body having curved cutting and reaming edges substantially at or near the periphery of the bit, parallel straight chopping edges spaced equidistantly from the axial center of the bit at the opposite sides of the bit face and projecting forwardly a substantial distance in advance of said curved edges, and an additional straight cutting edge located on the bit face rearwardly of said chopping edges, said parallel straight chopping edges arranged perpendicular to straight lines tangent to said curved edges at the bit periphery.

8. In a drill bit of the type which is percussively actuated and intermittently rotated during drilling, having at its forward end rectangularly-related pairs of aligned wings whose extremities lie in a common surface of revolution whose axis coincides with the bit axis, said wings each supporting a cutting edge and the cutting edges on the wings of one of said pairs being curved and lying substantially in a surface of revolution which lies slightly inside of said first mentioned surface of revolution, said bit also having cutting edges spaced inwardly from said second surface of revolution toward a diametric line parallel to straight lines tangent to said curved cutting edges at the central points in the latter, and said second mentioned inwardly spaced cutting edges located at opposite sides of said diametric line between the center of the bit and the bit periphery and said second mentioned inwardly spaced cutting edges projecting forwardly a substantial distance in advance of said first mentioned cutting edges.

JOHN C. CURTIS.

REFERENCES CITED

The following references are of record in the file of this patent:

UNITED STATES PATENTS

| Number | Name | Date |
|---|---|---|
| 609,107 | Leyner | Aug. 16, 1898 |
| 616,273 | Strauser et al. | Dec. 20, 1898 |
| 1,571,348 | Stee | Feb. 2, 1926 |
| 2,121,914 | Hokanson | June 28, 1938 |
| 2,168,102 | Nast | Aug. 1, 1939 |
| 2,310,288 | Hokanson | Feb. 9, 1943 |

FOREIGN PATENTS

| Number | Country | Date |
|---|---|---|
| 135,917 | France | Apr. 5, 1880 |